(12) United States Patent
Hantman et al.

(10) Patent No.: US 7,946,452 B2
(45) Date of Patent: May 24, 2011

(54) MULTIPLE CHAMBER BOTTLE WITH DIAGONAL DIVISION(S) ACHIEVING CURVILINEAR SURFACE DIVISION(S)

(76) Inventors: Ken S. Hantman, Huntingdon Valley, PA (US); Ray Lindsey, Winthrop, ME (US); Chris S. Hantman, Huntingdon Valley, PA (US); Chris Gill-Lindsey, Winthrop, ME (US)

( * ) Notice: Subject to any disclaimer, the term of this patent is extended or adjusted under 35 U.S.C. 154(b) by 980 days.

(21) Appl. No.: 11/286,650

(22) Filed: Nov. 23, 2005

(65) Prior Publication Data

US 2007/0029275 A1 Feb. 8, 2007

Related U.S. Application Data

(63) Continuation-in-part of application No. 10/461,149, filed on Jun. 13, 2003, now Pat. No. 7,036,684.

(60) Provisional application No. 60/388,506, filed on Jun. 13, 2002, provisional application No. 60/388,581, filed on Jun. 13, 2002.

(51) Int. Cl.
*B65D 35/22* (2006.01)
*A47G 19/00* (2006.01)

(52) U.S. Cl. ...... 222/94; 222/135; 220/23.4; 220/23.83; 215/10; 215/6

(58) Field of Classification Search ............ 222/94, 222/143, 144.5, 130, 134–137; 220/23.4, 220/23.83; 215/10, 6
See application file for complete search history.

(56) References Cited

U.S. PATENT DOCUMENTS

| | | | | |
|---|---|---|---|---|
| 3,506,157 A * | 4/1970 | Dukess | ......... | 222/94 |
| 5,154,917 A * | 10/1992 | Ibrahim et al. | ......... | 424/44 |
| 5,740,947 A * | 4/1998 | Flaig et al. | ......... | 222/135 |
| 5,954,213 A * | 9/1999 | Gerhart et al. | ......... | 215/10 |
| 6,799,699 B1 * | 10/2004 | LeMarr et al. | ......... | 222/94 |
| 6,857,530 B2 * | 2/2005 | Yourist | ......... | 215/10 |

* cited by examiner

*Primary Examiner* — Kevin P Shaver
*Assistant Examiner* — Melvin A Cartagena

(57) ABSTRACT

A diagonally divided bottle is disclosed, wherein the bottle includes at least two bottle sections separately formed, each bottle section including a bottom wall and outer wall extending therefrom defining a chamber. At least one portion of the outer wall of each bottle section has a portion adapted to mate with the portion of another bottle section. The mated portions of the bottle sections form at least one common wall. The common wall is arranged at an angle disposed diagonally to a major axis of the bottle when viewed from the top or bottom such that products contained in the chambers of the bottle sections are simultaneously viewed when the diagonally divided bottle is observed from a front.

18 Claims, 12 Drawing Sheets

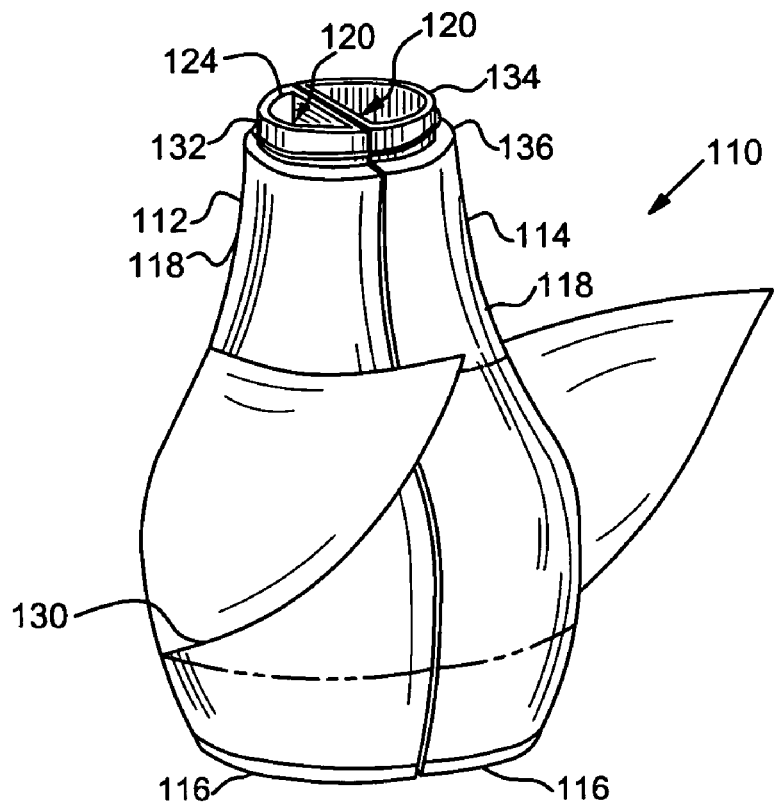
FIG 10
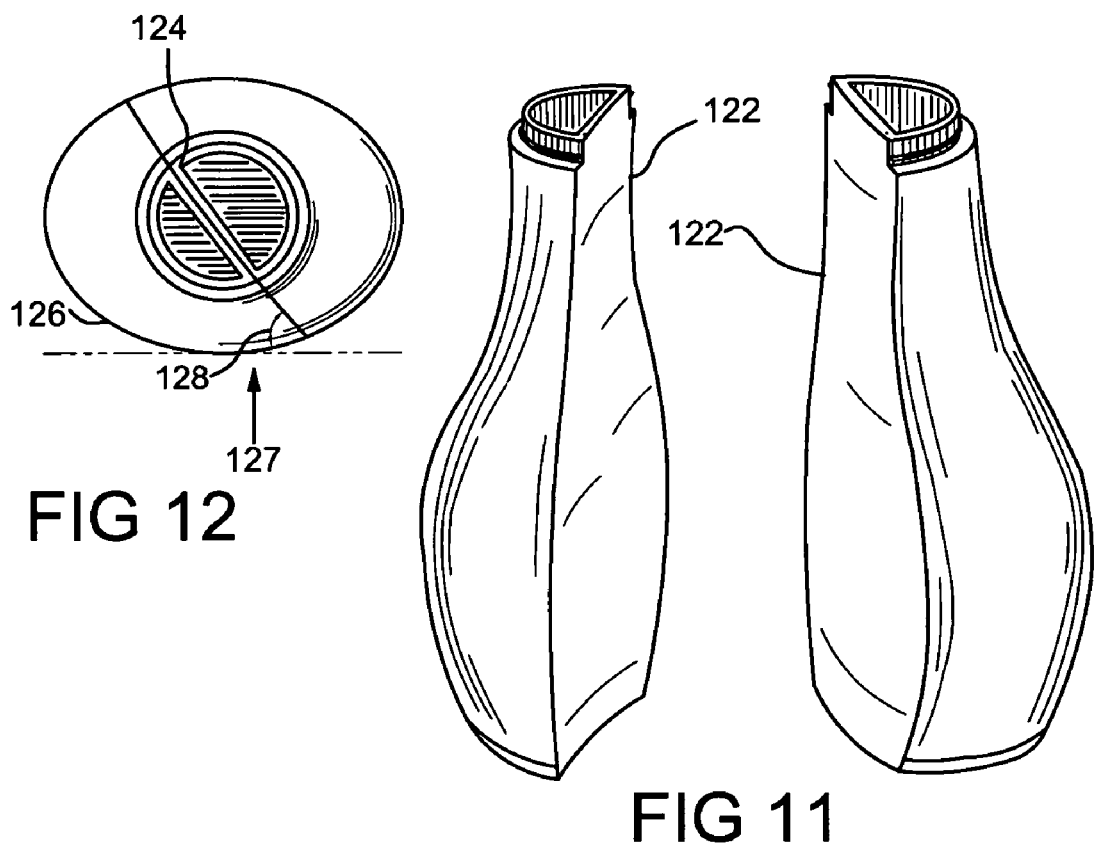
FIG 12
FIG 11

MULTIPLE CHAMBER BOTTLE WITH DIAGONAL DIVISION(S) ACHIEVING CURVILINEAR SURFACE DIVISION(S)

CROSS-REFERENCE TO RELATED APPLICATIONS

This application is a continuation-in-part of U.S. Utility application Ser. No. 10/461,149 filed Jun. 13, 2003, which claims priority to U.S. Provisional Application Ser. No. 60/388,506 filed Jun. 13, 2002 and U.S. Provisional Application Ser. No. 60/388,581 filed Jun. 13, 2002.

FIELD OF THE INVENTION

This invention relates to a plastic container. More particularly, to a plastic container including at least one dividing wall to divide the container into at least two bottle chambers.

BACKGROUND OF THE INVENTION

Multichamber containers made of leather, glass, plastic and other materials have been manufactured to store and deliver contents such as different liquors, body moisturizing lotions, chemical drain cleaners, two-part epoxies, drugs, food products including condiments, and other contents which either benefit by being separately dispersed or are activated at the time of dispersal by mixing.

A dual chambered container disclosed in U.S. Pat. No. 284,127 to Gruenebaum presented two oppositely inclined necks to obviate the need to raise the flask overly much for the purpose of imbibing its liquors or wines. However, this design would not stand on a shelf nor be suitable to viscous contents.

U.S. Pat. No. 1,363,064 to Stegath introduced a duplex tube which presented the convenience of keeping complementary items such as shaving cream and lotion at hand in one container, in this case a flexible squeezable metal tube. The container disclosed by Stegath would not be suitable to storage in an upright position on a shelf, nor is it suitable for food products due to the strong association of such tubes with toiletry and medicinal items.

U.S. Pat. No. 2,661,870 to Huenergardt; U.S. Pat. No. 3,197,071 to Kuster; U.S. Pat. No. 3,206,074 to Hoffman; and U.S. Pat. No. 3,467,269 to Newton present various container designs suitable to displaying and storing on a shelf. However these containers are unduly complicated and expensive to manufacturer.

U.S. Pat. No. 3,506,157 to Dukess discloses a closure device to seal a multiple chamber container. The contents stored in the container would tend to intermix upon the flat surfaces normal to the prongs. U.S. Pat. No. 3,729,553 to D. Gold et al. is bulky and does not explain by what method the portrayed bottle is to be manufactured. U.S. Pat. No. 4,148,417 to Simmons discloses a fluid dispenser having dual chambers formed by a cast molding process or a blow-molding process. However, an adequate method to control the blow-molding of such a dual chamber is not reliably described.

In traditional blow-molding a plastic material is blown against solid walls of an encasing metal mold. Typically, to produce a dual chamber container with a blow-molding process, two singularly molded halves are formed and glued together. The side-by-side nozzles are bulky, awkward, complex, and inefficient. Containers produced according to this method do no achieve a desired aesthetic or marketing appeal. A further disadvantage is a splotchy appearance of glue on the dividing surface.

Another container of the prior art includes two halves of the container mechanically connected and glued together, with one half offset or displaced from the other but joined by a common cap. This container displays both ingredients when viewed frontally but sacrifices the sense of unity with two ingredients in one bottle.

Other containers of the prior art are directed to separating ingredients while stored, but intermixing the ingredients before dispensing for the purpose of activating the ingredients. Examples of such ingredients include body lotions, moisturizers, chemical drain cleaners, etc. One known design intermixes mustard and ketchup before dispensing. The intermixing of the contents often produces an unsavory appearance and loses any aesthetic delight of drawing designs in a dual color stream.

In known dual chamber bottles, a simple utilitarian joining of two halves has been utilized for such items as drain cleaners and two-part epoxies, or the ingredients and the means of separation are not viewable because the outer walls are opaque. Such packaging is not suitable to the demands of marketing and merchandising in highly competitive or "high-end" areas such as foods and cosmetics. Clearly this is an unaddressed problem when it comes to the real world of selling products in bottles. The present invention addresses and solves this problem.

In order to dispense the contents, the container should be able to be squeezed. It is understood that a divider in a bottle strengthens the bottle in the planar direction of the divider, making it more difficult to squeeze the bottle in the planar direction. Most bottles for display on shelves are wider than they are deep. Any division of the bottle perpendicular to the front or back inhibits the squeezing of the bottle because the squeezing would most desirably occur in a perpendicular direction along the divider.

If the known container were such that the front and back halves were separated, then one ingredient would not be visible when the bottle was displayed facing front on a shelf. The present invention overcomes this problem as well.

Indeed the containment and display of products is a crowded field. The need to simultaneously present the contents in dual chamber bottles, such as mustard and ketchup, has long been felt but, despite market need, has not previously been met.

Accordingly, the background art has the disadvantages of at least being unduly complicated in design and costly in manufacture, not being suitable to standing on a shelf for display, failing to address the display function of the bottle, or losing the unity of the bottle for this purpose. An example of an invention which resembles the present invention and yet is crucially dissimilar is Flaig, et. al 5,740,947. In Flaig a dual chamber bottle has a non-diagonal dividing wall comprised of two elements, namely a sinusoidal surface and a flat planar wall The flat planar portion does not translate to the exterior of the bottle. The flat plane does not achieve a curvilinear intersection with the surface of the bottle. The shape of the edge of the sinusoidal surface wholly determines the viewable line of division between the two bottle halves and not any interaction of this shape with the complexly curved outer bottle wall. Accordingly the shape and form do not read on the present invention.

SUMMARY OF THE INVENTION

The invention includes a bottle and method for providing the bottle with a diagonal section having a flat plane intersecting the outer walls of the bottle (perhaps curved outer walls) such that both contained ingredients are visible at once when the bottle is displayed when viewed from the front of the bottle. This function or utility is independent of the exact shape or design of the bottle and is incident upon and integral with the method of constructing the bottle.

The invention also includes a bottle and method for providing the bottle with one or two faces of an inner wall forming a "knife edge" of a tapered upper edge of a flat side or sides of the bottle, the edge standing proud above the circular rim formed by the joining of the two bottle portions. The compression of a twist-on cap or snap-on cap against this knife-edge forms a seal which keeps the two ingredients separate.

The invention also includes a bottle and method for providing the bottle with a knife-edge standing proud, and a twist-on cap containing two apertures.

Alternatively, everything above referred to in respect to two ingredients is also applicable to two or more ingredients by use of two of more sections affixed in a similar manner as will be discussed in greater detail below.

The invention includes a bottle and method for providing the bottle with bottle cap apertures, the square surface areas of which are proportioned as the corresponding volumetric areas of the bottle so sectioned.

The invention also includes an ergonomically improved flip-cap oriented so that the lip and détente for the flip-cap top is perpendicular to the divider wall which itself is angled at less than or equal to 90 degrees and approximately 30 degrees to a line dividing the bottle front to back. The flip-cap includes two tapered plugs which snap down into two corresponding raised apertures in a lower flat undercap, said two tapered plugs affecting a seal and reducing intermixing of ingredients upon the surface of an undercap.

Alternatively, the invention also includes a twist-on or snap-on spout or nozzle, of a tapered conical or cylindrical shape, and internally divided. The spout or nozzle is adapted to be sealed by an end cap, a plug, by helically twisting the "overcap" upon a "scaling rod", or by sliding upon an internal shaft affecting a seal when screwed or pushed downwards towards the bottle.

The invention also includes dip-tubes with a dispensing spout which crowns a snapped-on cap and functions by depressing the pump-action head connected to the tubes.

The invention further includes a diagonally divided bottle, comprising at least two bottle sections separately formed, each bottle section having a bottom wall and cooperating outer wall extending therefrom defining a chamber. At least one portion of the outer wall of each of the bottle sections has a portion adapted to mate with the corresponding portion of another section. The mated portions of the bottle sections form at least one common wall. The common wall is diagonally configured to a plane which is disposed 30 degrees to 70 or 110 to 150 degrees of a major axis of the bottle viewed from the top or bottom of the bottle.

The portion of the outer wall adapted to mate with the portion of another bottle chamber may be substantially flat. Also, the portion of one bottle section may be convex while the corresponding portion of another bottle section is convex. Furthermore, the portion of the outer walls may extend partly or the whole length of the outer wall of the bottle sections.

The common walls formed by mated portions of the outer walls of the bottle sections are aligned and oriented to form the diagonally divided bottle such that the contained ingredients are visible simultaneously when the bottle is displayed when viewed from a front of the bottle. This function or utility is independent of the exact shape or design of the bottle and is incident upon and integral with the construction of the bottle.

The invention also includes a means for orienting and aligning separately formed bottle chambers for attachment to create the diagonally divided bottle. One means of attachment is at least one stipple on the portion of the outer wall of one chamber section with at least one corresponding indentation on another bottle section to orient and align the bottle sections.

Another means of attachment is at least one groove on the portion of the outer wall of one bottle section with at least one corresponding protrusion on another bottle section. The groove and protrusion are adapted to slideably interact to orient and align the bottle sections.

Other means of attachment to be used alone with flat surfaced bottle sections or together with the stiple-indent or groove-protrusion configurations are to glue, heat weld, or shrink-wrap the bottle sections together.

Alternatively, everything above referred to in respect to two ingredients is also applicable to two or more ingredients by use of two or more sections affixed in a similar manner as will be discussed in greater detail below.

BRIEF DESCRIPTION OF THE DRAWINGS

The invention will be described in conjunction with the attached drawings in which like referenced numerals designate like elements, and wherein:

FIG. 10 is a perspective view of a diagonally divided bottle with a label in accordance with an embodiment of the invention and showing the label partially removed;

FIG. 11 is an exploded view of the diagonally divided bottle of FIG. 10;

FIG. 12 is a top view of the diagonally divided bottle as shown in FIG. 10;

DETAILED DESCRIPTION OF THE PREFERRED EMBODIMENT

Figure 1:
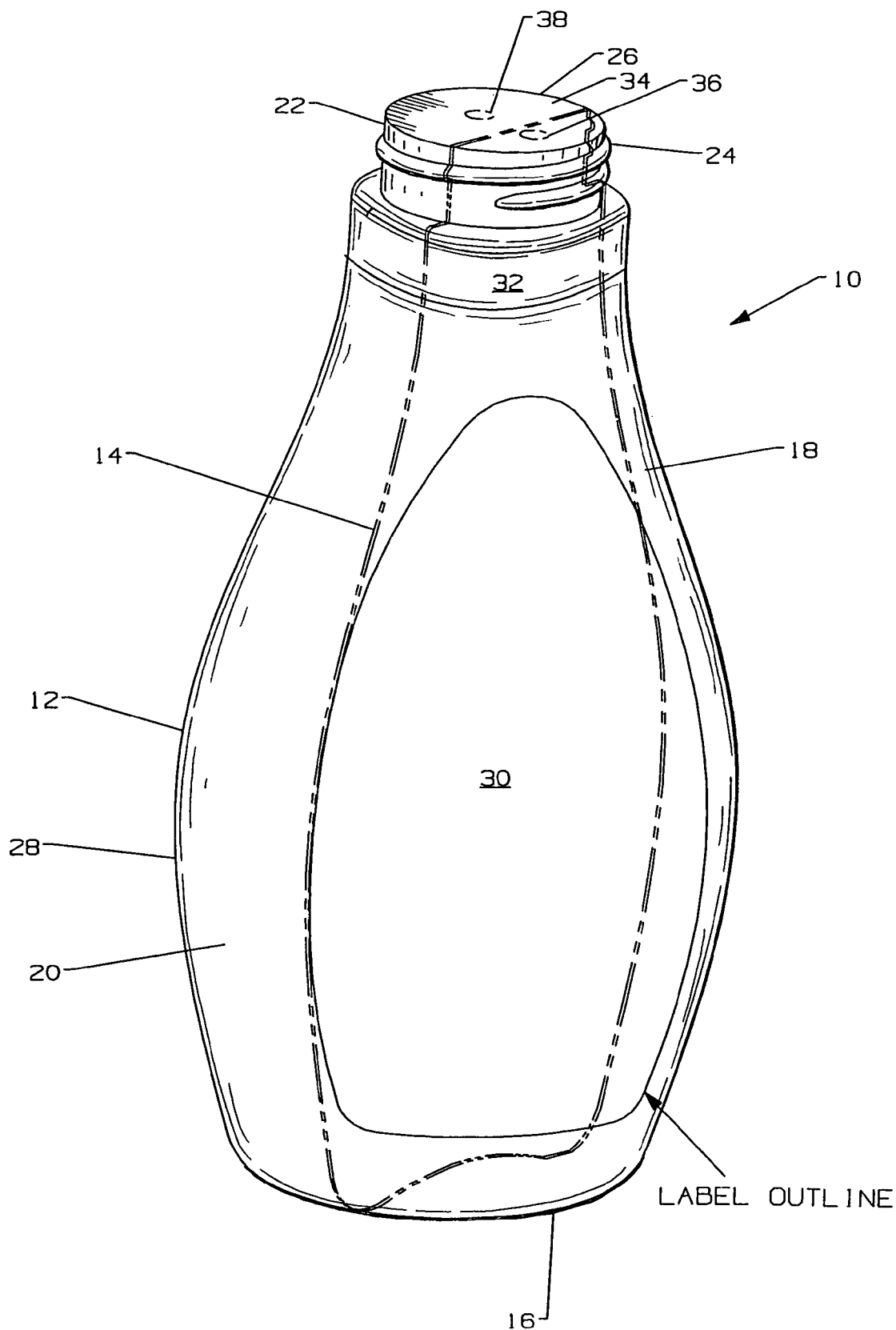
FIG. 1 is a perspective view of a diagonally divided bottle in accordance with an embodiment of the invention.

FIG. 1 shows a diagonally divided bottle 10 in accordance with an embodiment of the invention. The bottle 10 includes an annular outer wall 12, an inner wall 14 and a bottom wall 16. The annular outer wall 12 and bottom wall 16 cooperate to form an interior divided by the inner wall 14. The inner wall 14 seals to the outer wall 12, to form a fluid tight seal between the divided interior, and to define separate interior chambers 18, 20.

Figure 2:
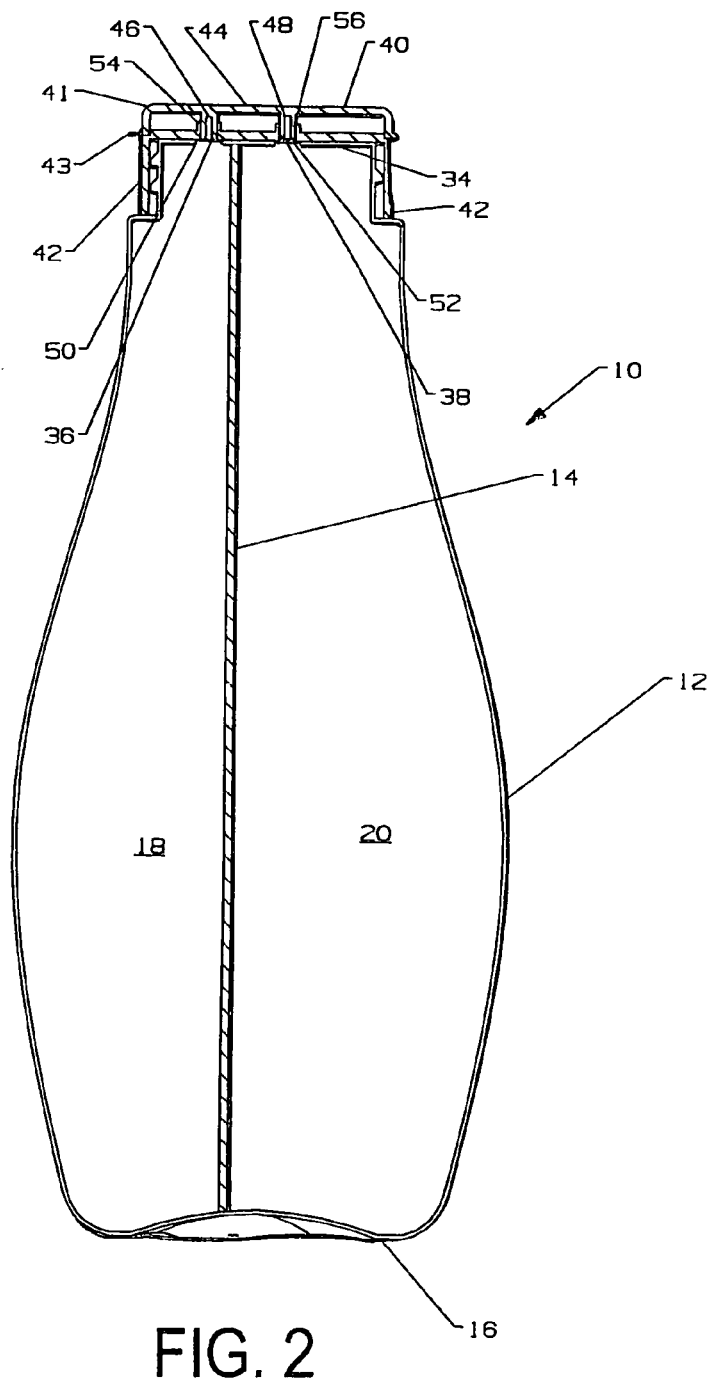
FIG. 2 is a sectional view of the bottle shown in FIG. 1 taken along line 2-2 with a flip cap.

The outer wall 12 includes an upstanding mouth 22, having an exterior threaded neck 24 for allowing rotational engagement with a cap 40 as shown in FIG. 2. The cap 40 includes interior threads, notches or teeth adapted to engage the exterior threads of the neck 24. The mouth 22 has a rim 26 arranged to seal against a lid or cover for sealing contents in the interior chambers 18, 20. Although a flip-type cap 40 is shown, it is understood that other cap types can be used as desired.

The inner wall 14 extends from the bottom wall 16, along the outer wall 12 at least to the rim 26 of the mouth 22 sufficiently to abut the cap 40 and maintain a sealed separation of the interior chambers 18, 20. While not being limited to a particular embodiment, the inner wall 14 extends above the mouth 22, standing proud of the rim 26 sufficiently to make a positive seal with a lid, as will be described in greater detail below. While a flat plastic, paper or foil cover may attach to and extend across the rim 26, a screw-on lid or cap, having an integral depending skirt with matching threads may not seal across the rim 26, forming a gap between an interior underside of the cap, and the mouth. In this situation, the interior wall 14 extends above the rim 26 for abutting the interior underside of the cap to form a seal separating the interior chambers 18, 20, as will be described in greater detail below.

The bottle 10 includes a flat cover 34 made of a plastic, paper or foil that extends across the rim 26. The cover 34 attaches to the rim 26 around the mouth 22 to form a seal against the rim 26. As can best be seen in FIG. 2, the inner wall 14 extends up to and abuts the cover 34, forming a seal along the abutment that prevents contents of one interior chamber 18, 20 from spilling over into the other interior chamber 20, 18. The cover 34 includes a cover aperture over each interior chamber for allowing communication to each chamber. In FIG. 2, cover aperture 36 allows fluid access from interior chamber 18 outside the bottle 10, and cover aperture 38 allows fluid access from interior chamber 20 to outside the bottle 10.

The bottle shown in FIG. 2 also includes the cap 40 having an interior undercap 41 with an integral depending skirt 42. The skirt 42 has interior threads, notches or teeth adapted to receive the threads of the neck 24. As can best be seen in FIGS. 2-6, the interior undercap 41 includes two top apertures 50, 52, each aperture surrounded by an annular boss 54, 56. In the embodiment shown, the cap 40 is produced by compression molding, although any conventional production method can be used as desired. The cap 40 includes a pivotally mounted overcap 44 having plugs 46, 48 arranged to fit into the inner portion of the annular bosses 54, 56 and top apertures 50, 52. The cap 40 is arranged to close over the bottle 10 such that the plugs 46, 48, top apertures 50, 52 and annular bosses 54, 56 are aligned over the cover apertures 36, 38 of the flat cover 34, respectively. Thus, when the cap 40 is opened the apertures of the bottle 10 and the cap 40 cooperate to provide access to the interior chambers 18, 20, and the products therein. The cap 40 is one example of a bottle cap assembly for keeping products in each chamber separate in the bottle and through the assembly. Bottle caps within the scope of the invention are thus not limited to the cap 40 discussed herein.

Regarding the cap 40, the two plugs 46, 48 snap down into their corresponding raised annular bosses, 54, 56 in the undercap thus affecting a seal and preventing the intermixing of ingredients upon the surface of the undercap 41. The overcap 44 is joined to the undercap 41 by a hinge 43 to accommodate the pressure of the two-plug cap 40. The hinge 43 may be a butterfly hinge, living hinge, or any other suitable hinge mechanism. However no hinge is required to affect the closure. In any event the overcap 44 should exceed about 1¼ inches in diameter to militate against swallowing by children.

The embodiments exemplified in FIGS. 2, 4, 5, 6 and 7 also show a diagonally divided bottle including the ergonomically improved cap 40 oriented to include so that the lip and détente for the flip cap is perpendicular to the divider wall 14 which itself is angled at approximately 30 degrees to a line dividing the bottle front to back; this corresponds to the natural ergonomic position of the thumb of the right hand when the bottle is held by the left hand. Whereas bottle caps are often so positioned they normally appear askew given the visual clues of the bottle, and in this sense do not follow best ergonomic design. In one embodiment design the visual clues are congruent with the functional design thus improving the ergonomics of use.

One equivalently structured cap 40 for the diagonally divided bottle 10 includes a twist-on or snap-on spout or nozzle, of a tapered conical shape itself internally divided, and sealed either by means of an end cap or plug, by helically twisting its overcap upon a scaling rod, or by sliding upon an internal shaft, affecting a seal when screwed or pushed downwards towards the bottle 10. In this case, because the nozzle is divided, two internal spouts, themselves helically shaped, fit through helical bores through the overcap as they reach the sealed position.

Figure 6:
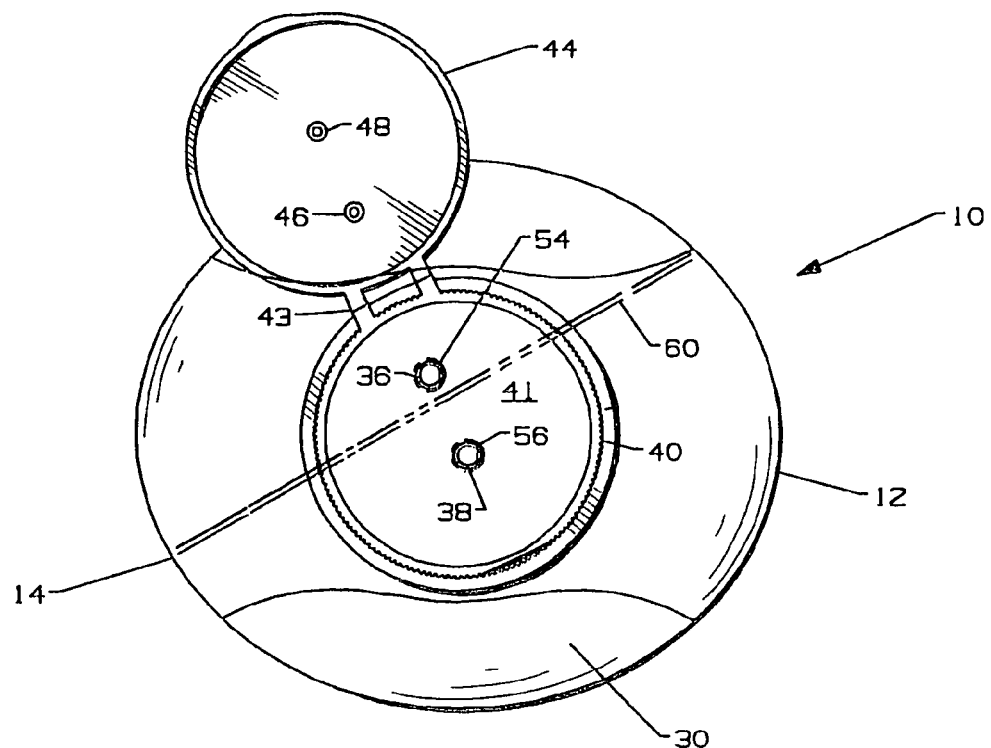
FIG. 6 is a top view partially in section of the diagonally divided bottle as shown in FIG. 2 with the flip cap in an open position.
Figure 7:
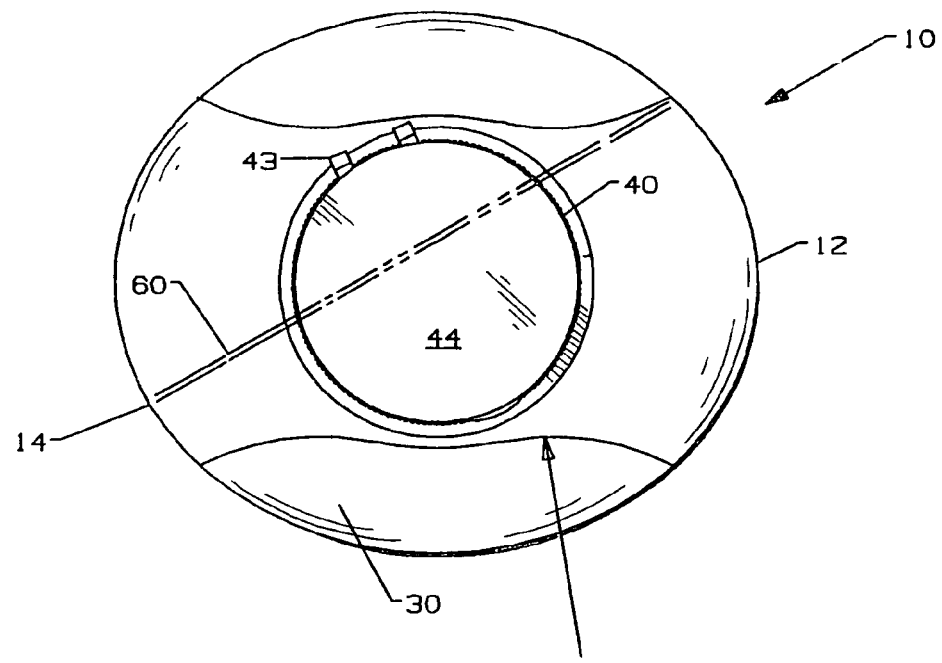
FIG. 7 is a top view partially in section of the bottle and flip cap of FIG. 2.
Figure 8:
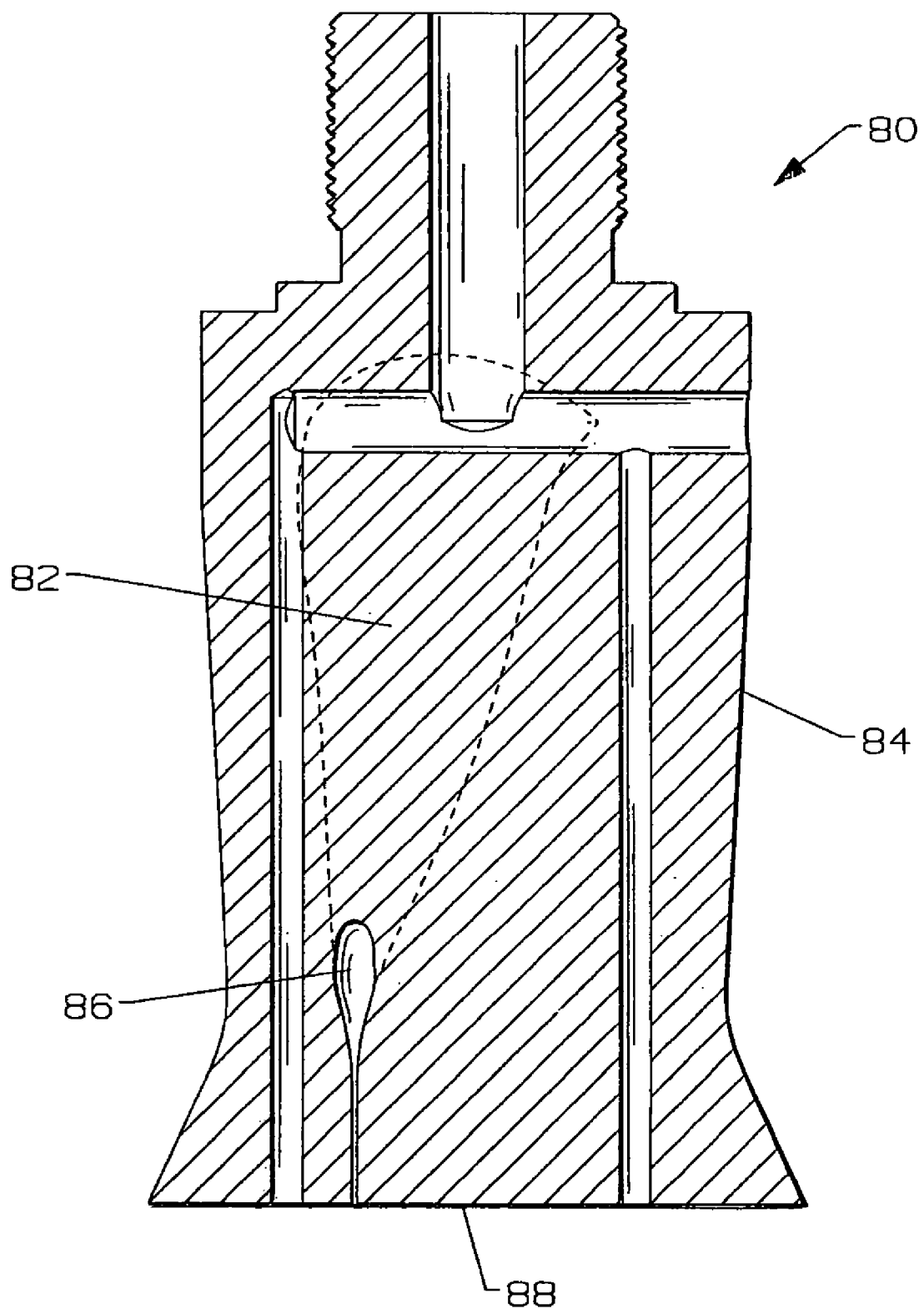
FIG. 8 is a sectional view of a mandrel used in accordance with the embodiments of the invention.

While not being limited to a particular embodiment, the bottle 10 is somewhat conal and cylindrical in shape, having a wider midsection 28 and tapered near the neck 24 and bottom wall 16. The bottle 10 shown in FIG. 1 includes a label 30 on the front of the bottle 10 and a label 32 wrapped around the neck for identification of the products inside the bottle 10. The label 30 is attached to the front of the bottle 10 by an adhesive (e.g., glue) and is defined by its outline 31. The bottle 10 is wider along its front and back, than deep along its sides when the bottle is standing on its bottom wall 16. The bottle 10 may also include a label on the back of the bottle for further identification or information of the product. The inner wall is shown diagonally intersecting the bottle so that both products in the bottle can be viewed simultaneously from the front of the bottle. As best shown in FIGS. 2, 6 and 7, the inner wall 14 may be offset from the central longitudinal axis of the bottle when more of one product is desired in the bottle, for example, two thirds ketchup and one third mustard).

In one embodiment, the inner wall 14 is in the bottle 10 when the bottle is formed. Without being limited to a particular theory, a blow-molding process for making the diagonally divided bottle 10 is described in a co-pending U.S. patent application Ser. No. 10/461,112, filed Jun. 13, 2003, the disclosure of which is incorporated herein by reference in its entirety. In particular, the process is an extrusion blow molding method that forms a parison by simultaneously extending plastic around and through a special mandril 80 shown in FIG.

8. The mandril 80 includes channels 82 along its side 84 that pull liquid plastic into a central or nearly central slot 86 that extends across the mandril down to the bottom side 88. The plastic flows out of the mandril both through the slot and around the mandril forming a parison. The formed parison has an inner divider wall or curtain within the parison wall. A split cavity mold closes around the parison with the curtain inside. The split cavity mold is cooled, with chilled water and closed.

Figure 9:
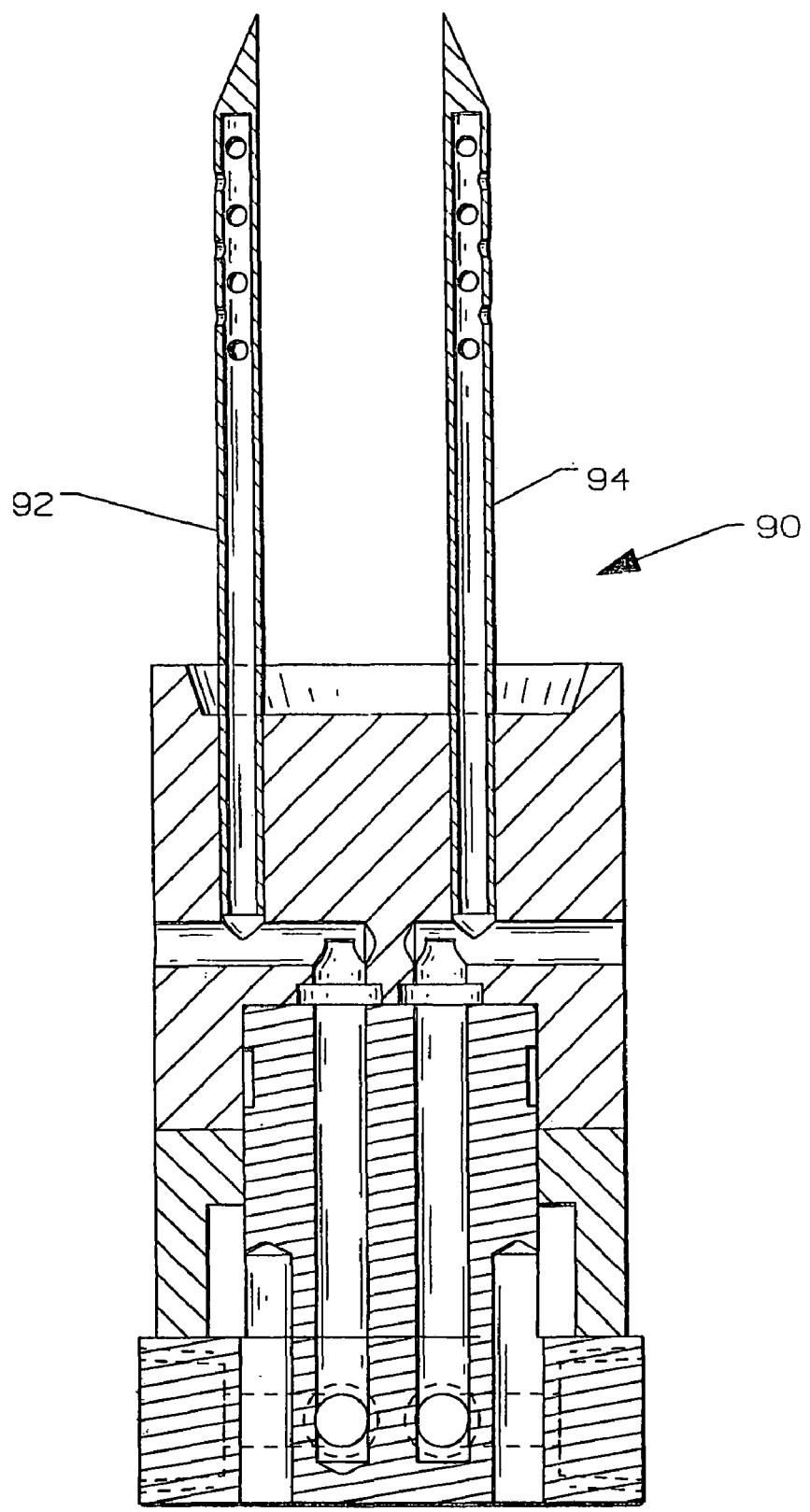
FIG. 9 is a sectional view of an exemplary dual chamber blow needle device used in accordance with the embodiments of the invention.

After the mold is closed, compressed air is introduced to each side of the mold cavity causing the parison to inflate around the inside wall of the split cavity mold while suspending the curtain by air inside the cavity. An exemplary dual chamber blow needle device 90 is shown in FIG. 9, having a separate needle 92, 94 for each chamber 18, 20. This blow-molding step forms the plastic bottle 10 and the bottle is cooled. Once the plastic bottle 10 is cooled, the mold opens and the blow-molding machine ejects the bottle.

Naturally the effect of this design is enhanced by filling a transparent or translucent bottle with ingredients of different colors, however the precise function of the invention with respect to dispersal and ease of handling would pertain even if the ingredients were of the same color or themselves clear.

The embodiments show a bottle and method for providing the bottle 10 with an inner diagonal section, inner wall 14 intersecting the outer wall 12 of the bottle 10 such that both contained ingredients are visible at once when the bottle is viewed from the front. This function or utility is independent of the exact shape or design of the bottle and is incident upon and integral with the method of constructing the bottle. In other words, the invention is not limited to any particular bottle shape or design. The aesthetic look of the line of division is achieved using the economical flat planar division method described herein.

The offset of the inner wall 14 can best be seen in FIGS. 2, 6 and 7. FIG. 2 shows a sectional view of the offset inner wall 14, while FIGS. 6 and 7 are top views of the bottle 10 showing the offset inner wall 14 as a dashed line 60 across the bottle 10 and flip cap 40. This offset is most desirable when a seller wants to sell more of a first product in the bottle than a second product (e.g., more ketchup than mustard). Both products are expelled at a rate that corresponds to the volume of the product's respective chamber (e.g., if the products have a 1/3 to 2/3 volume ratio, then the first product is expelled half as fast as the second product). To help ensure that both chambers empty the products evenly, so that the amount of both products remaining in the bottle corresponds with the volume in both chambers (e.g., both products empty at the same time), the opening of the flip cap 40 can be sized to correspond to the thickness of the respective product. For example, if the products in both chambers have the same thickness, then the opening 52 should be larger than the opening 50. Accordingly, the square surface areas of the bottle cap apertures are proportional to the corresponding volumetric areas of the bottle so sectioned.

Figure 3:
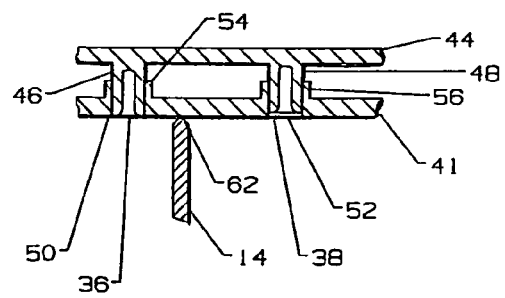
FIG. 3 is a partial sectional view of another embodiment of the invention.
Figure 4:
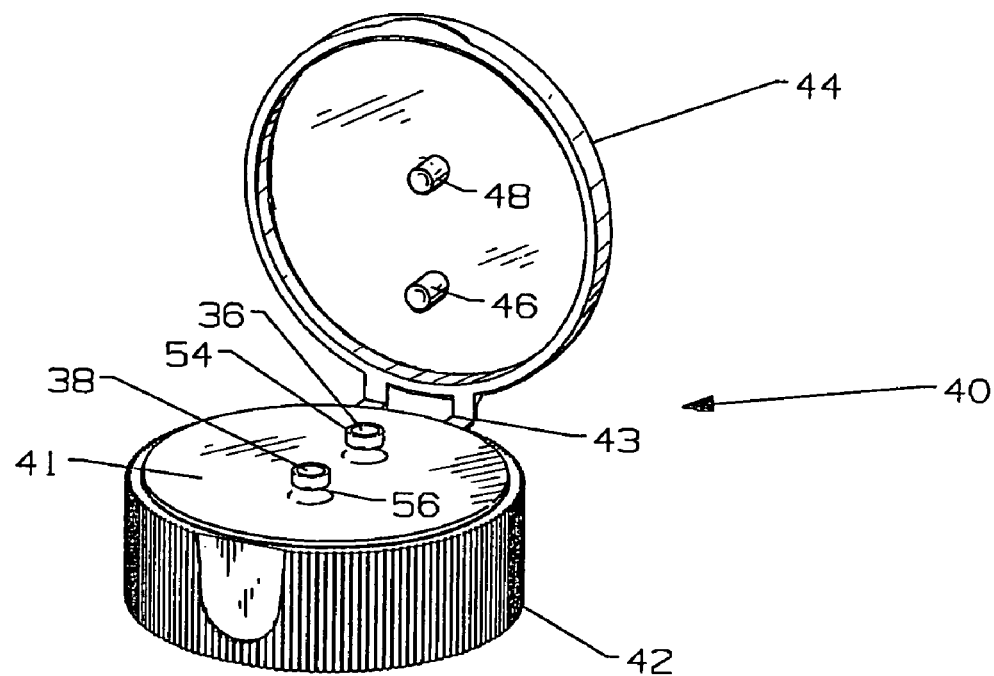
FIG. 4 is a perspective view of the flip cap shown in FIG. 2 in a semi-open position.
Figure 5:
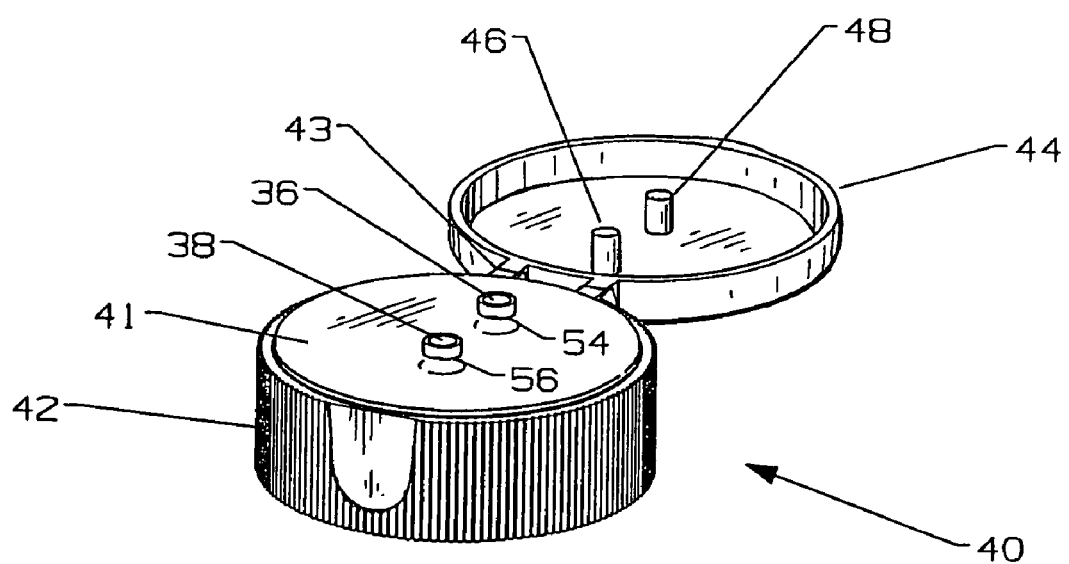
FIG. 5 is a perspective view of the flip cap of FIG. 2 in a fully opened position.

FIG. 3 shows a partial section of the bottle 10 wherein the top edge of the inner wall forms a knife edge 62 near the mouth 22 of the bottle. While not being limited to a particular embodiment, the top edge extends beyond and stands proud above the rim 26 formed by outer wall 12 of the bottle 10. In this embodiment, the compression of the twist-on cap 40 or of an equivalent snap-on cap against this knife-edge 62 forms a seal, which keeps the two ingredients separate.

The embodiment in FIG. 3 is thus different than the embodiment shown in FIG. 2, which includes a cover 34 across the bottle's top circular rim 26. In FIG. 2, the top edge of the inner wall extends across the top circular rim 26 against the cover 34 to form a seal that keeps the two ingredients separate. In FIG. 3, the bottle 10 does not include a flat cover 34, so the inner wall 14 extends beyond the rim 26 to be sealed by compression of the cap 40.

It is understood that everything above referred to in respect to two ingredients is also applicable to two or more ingredients by use of two of more sections affixed in a similar manner.

As an alternate approach to the bottle discussed above, two or more bottle sections may be formed separately. The diagonally divided bottle would include at least two separate bottle sections mated and attached together as described further below. The mated portions of the at least two bottle sections would form a common wall diagonally dividing the bottle.

FIGS. 10, 11, and 12 show a diagonally divided bottle 110 in accordance with an embodiment of the invention. The bottle 110 comprises a first bottle section 112 and a second bottle section 114. Each bottle section has a bottom wall 116 and cooperating outer wall 118 extending therefrom defining a chamber 120. At least one portion 122 of the outer wall 118 of each of the bottle sections 112, 114 has a surface adapted to mate with the portion of another bottle section. A common wall 124 is formed between the mated portions 122 of the bottle sections 112, 114. The common wall 124 is diagonally configured to a plane 126 tangential to a front 127 of the diagonally divided bottle 110 at an angle 128 extending between 30 degrees and 70 degrees, and 110 degrees and 150 degrees.

The front 127 may be any side of the diagonally divided bottle such that the common wall is diagonally configured at an angle extending between 30 degrees and 70 degrees, and between 110 and 150 degrees from the front 127. In addition to meeting the angular limitation of the common wall, the front 127 must be located in such a manner that the products contained in the chambers 120 of the bottle sections are simultaneously viewed.

The diagonally divided bottle 110 shown in FIGS. 10,11, and 12 is configured such that the common wall 124 extends at approximately a 45 degree angle from the plane 126 tangential to the front 127. When the diagonally divided bottle 10 is viewed from the front 127 both products contained in the chambers 120 of the bottle sections 112, 114 are simultaneously viewed. Furthermore, FIGS. 10, 11, and 12, show a diagonally divided bottle 110 having a cross-sectional shape of an oval with a depth greater than the width. However, the diagonally divided bottle 110 may have any cross-sectional shape so long as the common wall 124 made by the bottle sections 112, 114 extends between 30 degrees and 70 degrees or 110 degrees and 150 degrees and the products contained in the chambers 120 of the bottle sections 112, 114 are simultaneously viewed.

The portions 122 of the outer walls 118 of the bottle sections 112, 114 shown in FIGS. 10, 11, and 12 extend from the bottom wall 116 to beyond a top 132 formed by the remainder of the outer wall 118 to form an edge 134 standing proud above a rim 136. The edge 134 is adapted to interact with a cap (not shown) to form a seal that keeps the products within the chambers 120 of the bottle sections 112, 114 separate. The portions 122 of the outer walls 118 of the bottle sections 112, 114 do not necessarily extend from the bottom wall 116 to beyond a top 32 but may extend for a portion of the bottle sections 112, 114. Further, the outer walls 118 may have multiple portions 122 that mate with corresponding portions 118 with unmated or void space in between the mated portions 122.

FIGS. 10, 11, and 12 show a diagonally divided bottle wherein the portion 122 of the first bottle section 112 is concave while the portion 122 of the second bottle section 114 is convex. The concave-convex configuration is used because it allows the bottle sections 112, 114 to mate along the substantial entirety of the portions 122 of the bottle sections 112, 114. The portions 122 of the bottle sections 112, 114 are not limited to a concave-convex configuration but may also be substantially flat or otherwise configured.

FIG. 10 shows the diagonally divided bottle 110 with the bottle sections 112, 114 mated and held together via a label 130. Shrink wrapping, heat welding, adhesives, or any other appropriate means for holding the bottle sections 112, 114 together may be utilized.

Figure 13:
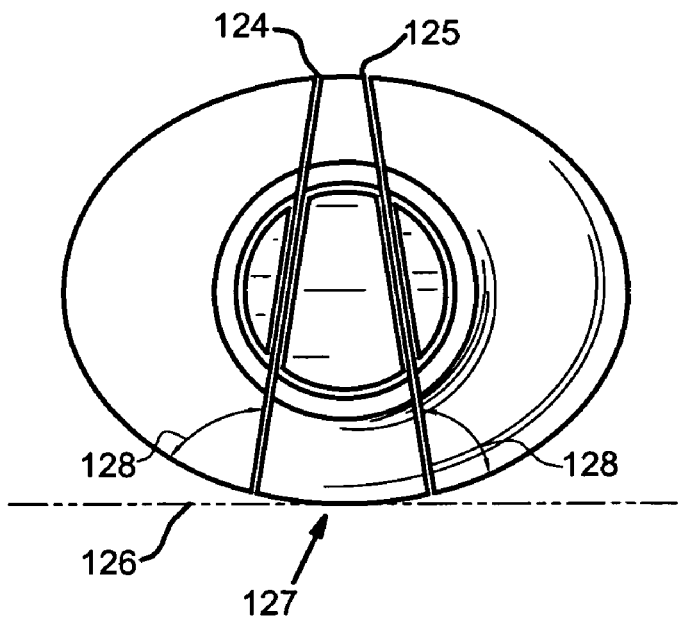
FIG. 13 is a perspective view of a diagonally divided bottle in accordance with another embodiment of the invention.
Figure 14:
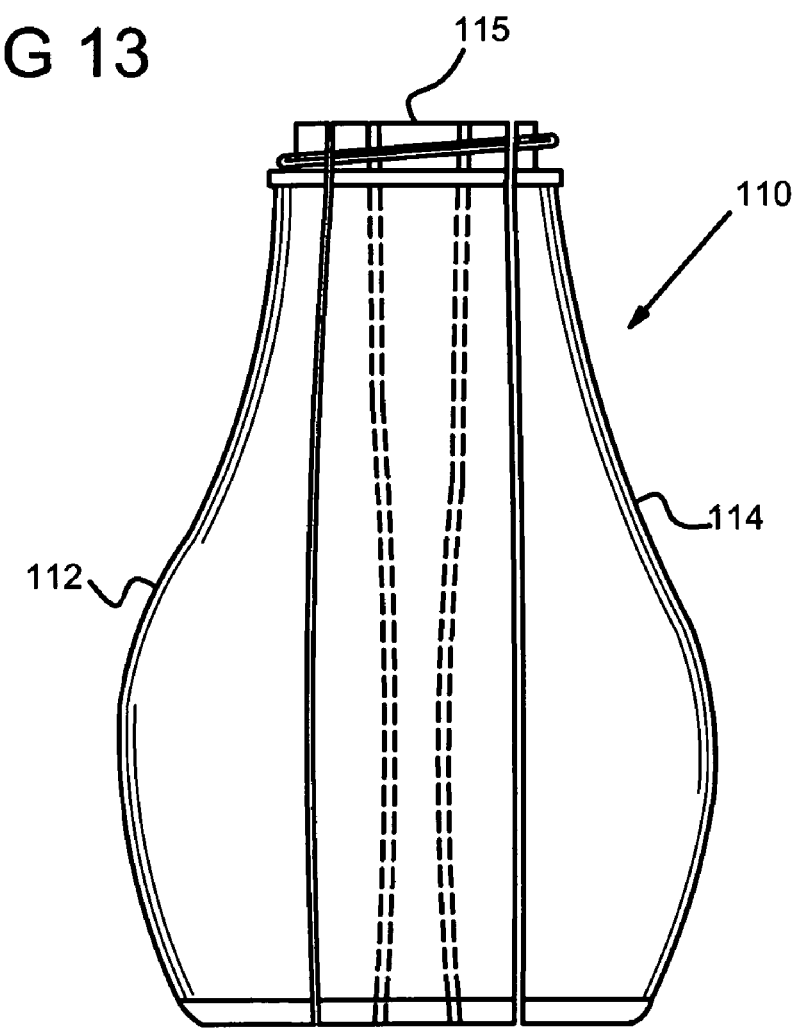
FIG. 14 is a top view of the diagonally divided bottle as shown in FIG. 13.
Figure 15:
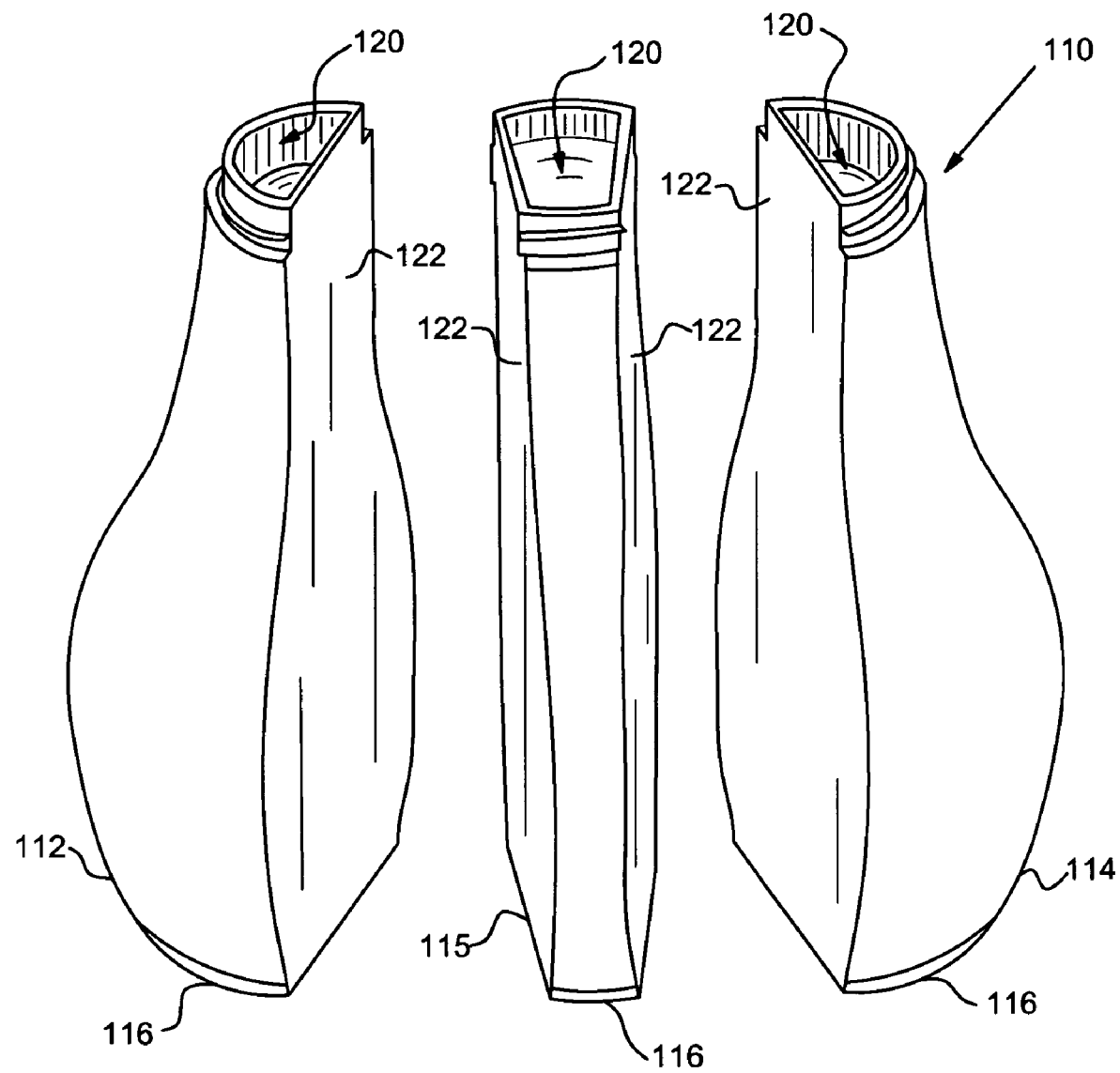
FIG. 15 is an exploded view of the diagonally divided bottle of FIG. 13.
Figure 16:
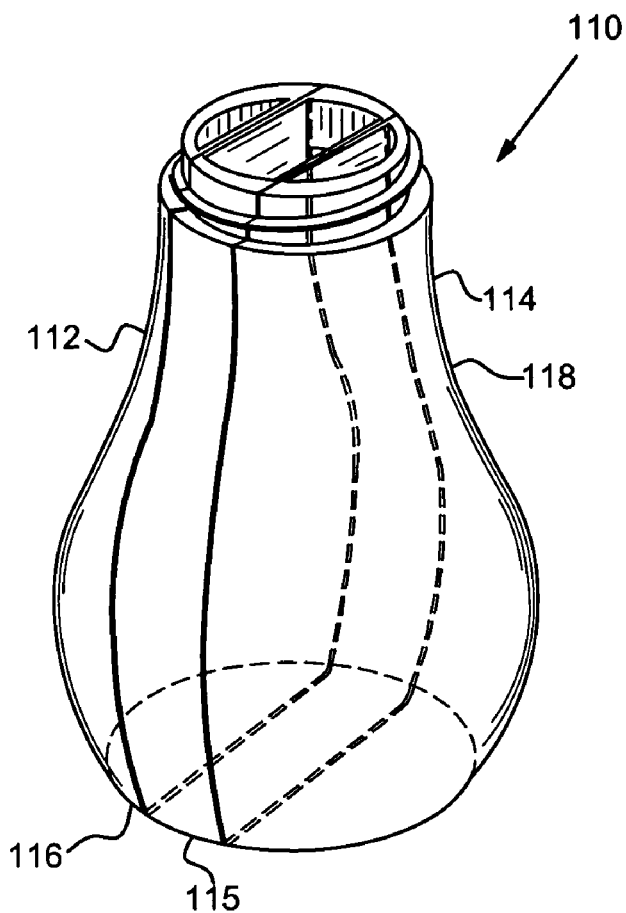
FIG. 16 is a perspective view of a diagonally divided bottle in accordance with another embodiment of the invention.
Figure 17:
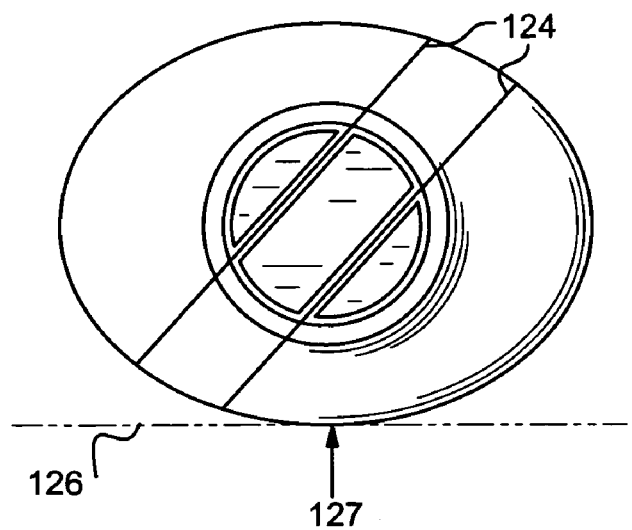
FIG. 17 is a top view of the diagonally divided bottle as shown in FIG. 16.

Another embodiment of the invention shown in FIGS. 13, 14, and 15 is similar to the embodiment shown in FIGS. 10, 11, and 12 except as described below. FIGS. 13, 14, and 15 show a diagonally divided bottle 110 further compromising a third bottle section 115. The third bottle section 115 has two portions 122 adapted to mate with the corresponding portion 122 of the first and second bottle sections 112, 114. A common wall 124 is formed between the mated portions 122 of the first and third bottle sections 112, 115. A second common wall 125 is formed between the mated portions 122 of the second and third bottle sections 114, 115. The common walls 124, 125 are both diagonally configured to a plane 126 tangential to the front 127 of the diagonally divided bottle 110 at an angle 128 extending between 30 degrees and 70 degrees or 110 degrees and 150 degrees. The common walls 124, 125 may be nonparallel as shown in FIGS. 13, 14, and 15 or substantially parallel as shown in FIGS. 16 and 17, so long as the products contained in the chambers 120 of the bottle sections 112, 114, 115 of the diagonally divided bottle 110 may be simultaneously viewed when observed from the front 127 by a consumer.

Figure 18:
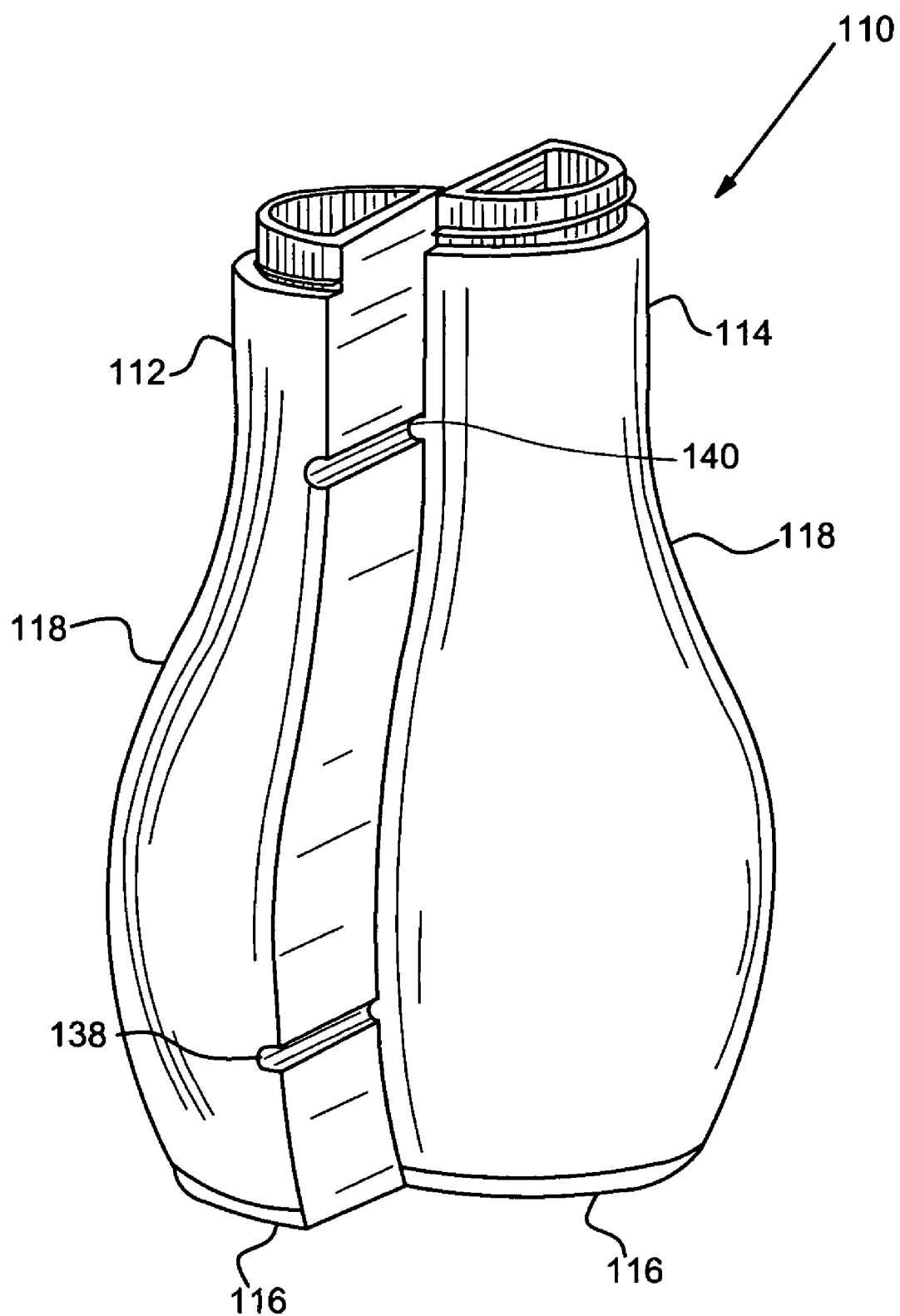
FIG. 18 is a perspective view of a partially assembled diagonally divided bottle in accordance with another embodiment of the invention.

Another embodiment of the invention shown in FIG. 18 is similar to the embodiment shown in FIGS. 10, 11, and 12 except as described below. The portion 122 of the outer wall 118 of the first bottle section 112 has at least one groove 138. The portion 122 of the outer wall 118 of the second bottle section 114 has at least one protrusion 140. The groove 138 and protrusion 140 are designed to slidably interact to align the bottle sections 112, 114 for attachment to one another. The groove 138 and protrusion 140 may be utilized to hold the bottle sections 112, 114 together or the groove 138 and protrusion 140 may be used in combination with shrink wrap, heat welding, adhesive, or other suitable means for holding the bottle sections 112, 114 together.

Figure 19:
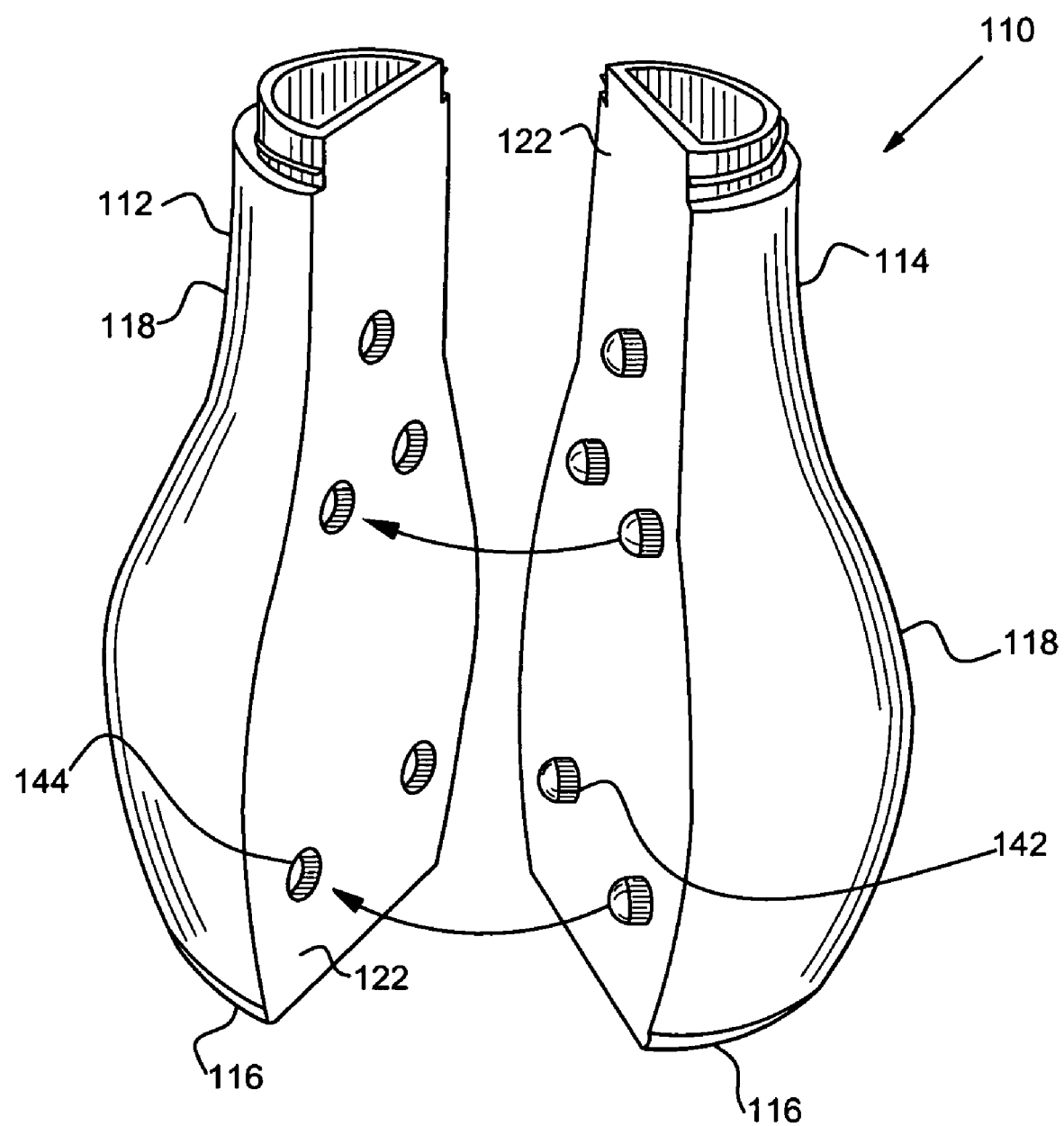
FIG. 19 is an exploded view of a diagonally divided bottle in accordance with another embodiment of the invention.

Another embodiment of the invention shown in FIG. 19 is similar to the embodiment shown in FIG. 18 except as described below. The portion 122 of the outer wall 118 of the first bottle section 112 has at least one stipple 142. The portion 122 of the outer wall 118 of the second bottle section 114 has at least one stipple 144. The stipple 142 and indent 144 are adapted to interact to align the bottle sections 112, 114 for attachment to one another. The stipple 142 and indent 144 may hold the bottle sections 112, 114 together by themselves or in combination with shrinkwrap, heat welding, adhesive, or other suitable means for attachment. Any number of stipples 142 and indents 144 may be utilized in the embodiment depending on manufacturing considerations such as cost and ease of processing.

It is understood that everything above referred to in respect to two ingredients is also applicable to two or more ingredients by use of two of more bottle sections affixed in a similar manner.

Materials for constructing the various embodiments described herein is a high-density polyethylene (HDPE). Alternatively, a low density polyethylene (LDPE), PVC, or other similar materials can be used.

In the present invention, the intersection of the complexly curved exterior by a planar inner wall diagonally oriented with respect to the side-to-side plane of the bottle, achieves an extremely aesthetically appealing curving line of division between the displayed ingredients. The divided bottle is economically formed and it arises intrinsically from application of the method regardless of the particular shape of the complexly curved bottle. The function of displaying ingredients for marketing purposes, as well as the containment and dispersal of the ingredients is thus met in a simple unified bottle design achieving great functional and aesthetic appeal.

Any ratio of the two ingredients may be achieved by having the diagonal wall intersect the center of the bottle (when viewed from above) or being displaced more or less from this center. This is portrayed in the drawings. Accordingly even a 50/50 ratio can be displayed with the curvilinear effect rather than the unremarkable or relatively less aesthetic display of a bottle split down the middle, right, and left. In an embodiment the products or ingredients have a ratio offset from 50/50 such as a 1/3 to 2/3 ratio.

It should be apparent from the aforementioned description and attached drawings that the concept of the present application may be readily applied to a variety of embodiments, including those disclosed herein. For example, the diagonally divided bottle may also include dip-tubes with a dispensing spout that crowns a snapped-on cap and functions by depressing the pump-action head connected to the tubes, as understood by a skilled artisan. Without further elaboration, the foregoing will so fully illustrate the invention that others may, by applying current or future knowledge, readily adapt the same for use under various conditions of service.

What is claimed is:

1. A diagonally divided bottle, comprising:
   at least two bottle sections, each bottle section having an outer wall and a bottom wall which cooperate to define a chamber therein, wherein at least a portion of the outer wall of one of the at least two bottle sections is adapted to mate with at least a portion of the outer wall of an other of the at least two bottle sections; and
   a common wall formed by the mated portions of the at least two bottle sections disposed substantially diagonally such as 30 degrees to 70 degrees and 110 degrees to 150 degrees with respect to a major axis of the bottle viewed from the top or bottom, wherein a product contained in each of the chambers of the at least two bottle sections is viewable when the diagonally divided bottle is observed from a front;
   the common wall(s) of a preferentially planar shape intersect with the outer wall of a preferentially complexly curved shape to form a curvilinear line(s) of intersection;
   whereby said inner wall(s) upon intersection of said outer wall forms a curved line(s) of intersection which is not coincident with nor parallel to nor equal to a longitudinal edge or seam of said bottle viewed frontally such that a visually attractive and graceful display of both or multiple ingredients is simultaneously effected and such that the border(s) between the two or multiple ingredients is directly mapped onto the surface of the bottle by means of the edge(s) of the dividing wall(s) intersecting the bottle surface.

2. The diagonally divided bottle of claim 1, wherein the diagonally divided bottle has a greater width than depth.

3. The diagonally divided bottle of claim 1, further comprising a label attached to the at least two bottle sections and arranged such that the label holds the mated bottle sections together, the label identifying the products contained in each chamber.

4. The diagonally divided bottle of claim 1, wherein the portion of the outer wall of the at least two bottle sections extends from the bottom wall to beyond a top formed by the remainder of the outer wall to form an edge standing proud above a rim.

5. The diagonally divided bottle of claim 4, further comprising a cap, compression of the cap against the proud edge standing above the rim forming a seal that keeps the products within each chamber separate.

6. The diagonally divided bottle of claim 1, wherein the at least two bottle sections is a first and a second bottle section and the portion of the outer wall of the first bottle section is concave and the portion of the second bottle section is convex.

7. The diagonally divided bottle of claim 1, wherein the portion of the outer wall of the at least two bottle sections is substantially flat.

8. The diagonally divided bottle of claim 1, including a first bottle section, a second bottle section, and a third bottle section, wherein a portion of the outer wall of the third bottle section is adapted to mate with at least a portion of one of said first and second bottle sections.

9. The diagonally divided bottle of claim 1, including a first bottle section, a second bottle section, and a third bottle section, wherein the portions of the first, second, and third bottle sections mate to form two common walls.

10. The diagonally divided bottle of claim 9, wherein the common walls are substantially parallel.

11. The diagonally divided bottle of claim 1, wherein the at least two bottle sections are assembled using shrink wrap.

12. The diagonally divided bottle of claim 1, wherein the at least two bottle sections are heat welded.

13. The diagonally divided bottle of claim 1, wherein the at least two bottle sections are glued.

14. The diagonally divided bottle of claim 1, wherein the portion of the one bottle section further comprises at least one groove and the portion of the other bottle section further comprises at least one protrusion adapted to slideably interact with the at least one groove, and the at least one groove and at least one protrusion are adapted to connect the at least two bottle sections together.

15. The diagonally divided bottle of claim 1, wherein the portion of the one bottle section further comprises at least one stipple and the portion of the other bottle section further comprises at least one indent adapted to interact with the at least one stipple, and the at least one stipple and at least one indent are adapted to hold the first and second bottle sections together.

16. A diagonally divided bottle, comprising:
a first bottle section having an outer wall and a bottom wall which cooperate to define a first chamber therein;
a second bottle section having an outer wall and a bottom wall which cooperate to define a second chamber therein, wherein at least a portion of the outer wall of the first bottle section is adapted to mate with at least a portion of the outer wall of the second bottle section;
the portion of the outer wall of the first bottle section and the portion of the second bottle section are non-planar such as concave and convex respectively; and
a common wall formed by the mated portions of the first and second bottle sections disposed substantially diagonally such as 30 degrees to 70 degrees and 110 degrees to 150 degrees with respect to a major axis of the bottle viewed from the top or bottom,
wherein a product contained in each of the chambers of the at least two bottle sections is viewable when the diagonally divided bottle is observed from a front.

17. A diagonally divided bottle, comprising:
a first bottle section having an outer wall and a bottom wall which cooperate to define a first chamber therein;
a second bottle section having an outer wall and a bottom wall which cooperate to define a first chamber therein;
a third bottle section having an outer wall and a bottom wall which cooperate to define a first chamber therein, wherein a portion of the outer wall of the first and second bottle sections and two portions of the outer wall of the third bottle section, each portion adapted to mate with a corresponding portion of an other bottle section; and
two common walls formed by the mated portions of the first, second, and third bottle sections disposed substantially diagonally such as 30 degrees to 70 degrees and 110 degrees to 150 degrees with respect to a major axis of the bottle viewed from the top or bottom,
wherein a product contained in each of the chambers of the first, second, and third sections is viewable when the diagonally divided bottle is observed from a front.

18. The diagonally divided bottle of claim 17, wherein the common walls are substantially parallel.

* * * * *